(12) United States Patent
Lim et al.

(10) Patent No.: US 7,623,731 B2
(45) Date of Patent: Nov. 24, 2009

(54) DIRECT METHOD FOR MODELING NON-RIGID MOTION WITH THIN PLATE SPLINE TRANSFORMATION

(75) Inventors: Jongwoo Lim, Sunnyvale, CA (US); Ming-Hsuan Yang, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 728 days.

(21) Appl. No.: 11/450,045

(22) Filed: Jun. 9, 2006

(65) Prior Publication Data

US 2006/0285770 A1 Dec. 21, 2006

Related U.S. Application Data

(60) Provisional application No. 60/692,899, filed on Jun. 20, 2005.

(51) Int. Cl.
*G06K 9/36* (2006.01)
(52) U.S. Cl. .................. 382/277; 382/282; 382/284; 382/293
(58) Field of Classification Search .............. 382/277, 382/278, 282, 293
See application file for complete search history.

(56) References Cited

U.S. PATENT DOCUMENTS 5,416,899 A  5/1995  Poggio et al.

(Continued)

FOREIGN PATENT DOCUMENTS

WO   WO 00/48509 A1   8/2000

OTHER PUBLICATIONS

Black, Michael J. et al., "EigenTracking: Robust Matching and Tracking of Articulated Objects Using a View-Based Representation," International Journal of Compuber Vision, 1998, pp. 63-84, vol. 26, No. 1.

(Continued)

*Primary Examiner*—Yosef Kassa
(74) *Attorney, Agent, or Firm*—Fenwick & West LLP; Mark Duell

(57) ABSTRACT

A system and a method model the motion of a non-rigid object using a thin plate spline (TPS) transform. A first image of a video sequence is received, and a region of interest, referred to as a template, is chosen manually or automatically. A set of arbitrarily-chosen fixed reference points is positioned on the template. A target image of the video sequence is chosen for motion estimation relative to the template. A set of pixels in the target image corresponding to the pixels of the template is determined, and this set of pixels is back-warped to match the template using a thin-plate-spline-based technique. The error between the template and the back-warped image is determined and iteratively minimized using a gradient descent technique. The TPS parameters can then be used to estimate the relative motion between the template and the corresponding region of the target image. According to one embodiment, a stiff-to-flexible approach mitigates instability that can arise when reference points lie in textureless regions, or when the initial TPS parameters are not close to the desired ones. The value of a regularization parameter is varied from a larger to a smaller value, varying the nature of the warp from stiff to flexible, so as to progressively emphasize local non-rigid deformations.

13 Claims, 6 Drawing Sheets

U.S. PATENT DOCUMENTS

| | | | |
|---|---|---|---|
| 5,680,531 | A | 10/1997 | Litwinowicz et al. |
| 5,960,097 | A | 9/1999 | Pfeiffer et al. |
| 6,047,078 | A | 4/2000 | Kang |
| 6,067,373 | A * | 5/2000 | Ishida et al. ............. 382/130 |
| 6,226,388 | B1 | 5/2001 | Qian et al. |
| 6,236,736 | B1 | 5/2001 | Crabtree et al. |
| 6,295,367 | B1 | 9/2001 | Crabtree et al. |
| 6,346,124 | B1 | 2/2002 | Geiser et al. |
| RE37,668 | E | 4/2002 | Etoh |
| 6,400,831 | B2 | 6/2002 | Lee et al. |
| 6,438,822 | B1 * | 8/2002 | Hattori .................. 29/739 |
| 6,539,288 | B2 | 3/2003 | Ishida et al. |
| 6,580,810 | B1 | 6/2003 | Yang et al. |
| 6,594,378 | B1 * | 7/2003 | Li et al. ................. 382/128 |
| 6,683,968 | B1 | 1/2004 | Paviovic et al. |
| 6,757,423 | B1 | 6/2004 | Amini |
| 6,870,945 | B2 | 3/2005 | Schoepflin et al. |
| 6,909,796 | B2 * | 6/2005 | Pomata et al. .......... 382/131 |
| 7,003,134 | B1 | 2/2006 | Covell et al. |
| 7,239,908 | B1 * | 7/2007 | Alexander et al. ....... 600/427 |
| 2001/0048753 | A1 | 12/2001 | Lee et al. |
| 2004/0208341 | A1 | 10/2004 | Zhou et al. |

OTHER PUBLICATIONS

Collins, R.T. et al., "On-Line Selection of Discriminative Tracking Features," Carnegie Mellon University, 2003, pp. 1-14.

International Search Report and Written Opinion, PCT/USO4/38189, Mar. 2, 2005.

International Search Report and Written Opinion, PCT/US05/24582, Feb. 9, 2006, 8 pages.

"Pose Invariant Affect Analysis Using Thin-Plate Splines," To appear Int. Conference on Pattern Recognition, Cambridge, UK, Aug. 2004, [online] [Retrieved on Oct. 9, 2006] Retrieved from the Internet<URL:http://cvrr.ucsd.edu/publications/2004/RAAS-ICPR2004.pdf>.

Tipping, Michael E. et al., "Probabilistic Principal Component Analysis," Journal of the Royal Statistical Society, Series B, Sep. 27, 1998, pp. 611-622, vol. 61, part 3.

PCT International Search Report and Written Opinion, PCT/US06/23350, Sep. 25, 2007, 8 pages.

* cited by examiner

DIRECT METHOD FOR MODELING NON-RIGID MOTION WITH THIN PLATE SPLINE TRANSFORMATION

CROSS REFERENCE TO RELATED APPLICATIONS

This application claims the benefit under 35 USC § 119(e) of U.S. Provisional Patent Application No. 60/692,899, filed on Jun. 20, 2005, titled "Direct Method for Modeling Non-Rigid Motion with Thin Plate Spline," the contents of which are incorporated herein by reference.

This application is related to U.S. patent application Ser. No. 11/179,881, filed on Jul. 11, 2005, entitled "Adaptive Discriminative Generative Model and Application to Visual Tracking," the contents of which are incorporated herein by reference.

This application is related to U.S. patent application Ser. No. 10/989,966, filed on Nov. 15, 2004, entitled "Adaptive Probabilistic Visual Tracking with Incremental Subspace Update," the contents of which are incorporated herein by reference.

FIELD OF THE INVENTION

The present invention generally relates to the field of computer-based visual perception, and more specifically, to modeling the appearance and motion of non-rigid objects.

BACKGROUND

An area of challenge within the computer vision community is effectively modeling an object's appearance when the object undergoes rigid or non-rigid motion. Numerous methods have been developed to handle rigid object motion, and algorithms have recently been proposed for non-rigid motion. Affine transformations evidently have been successfully applied to model global rigid object motion. However, it is well known that affine transformation is not effective when the modeled object undergoes non-rigid motion such as facial expressions and movements of human bodies. Such motion often carries important information for vision applications. Thus it is important to develop an effective model for non-rigid object deformation, as well as an efficient algorithm for recovering deformation parameters directly from image sequences.

Conventional approaches to modeling non-rigid object motion from visual cues span contour, appearance, and optical flow. Contour-based methods mainly use edge information near or on the boundary of the target object, and seek a transformation that matches object shapes by minimizing an energy function. Algorithms such as snakes, active shape modeling, active contour with condensation and geodesic contours have been applied to model non-rigid objects. These methods differ in the approach to shape representation, including energy functions defined in terms of edges and curvature, statistical distributions of points on a contour, curvature normals, and energy functions defined by level sets. Gradient descent algorithms are then applied to minimize energy functions or to fit the model to the image. Alternatively, factored sampling based methods can be applied to best match an image observation to a model. A drawback shared by the abovementioned methods is that initialization of points or edges on or near the object contour is useful for success. Furthermore, since these methods utilize only the contour of an object for matching, they ignore the abundant and rich texture information available. Descriptions of these concepts can be found in T. Cootes, et al., Active Shape Models—Their Training and Application, Computer Vision and Image Understanding, 1995; M. Isard and A. Blake, Contour Tracking by Stochastic Propagation of Conditional Density, Proceedings of the Fourth European Conference on Computer Vision, LNCS 1064, Springer Verlag, 1996; M. Kass, et al., Snakes: Active Contour Models, International Journal of Computer Vision, 1(4), 1987; and N. Paragios and R. Deriche, Geodesic Active Contours and Level Sets for the Detection and Tracking of Moving Objects, IEEE Transactions on Pattern Analysis and Machine Intelligence, 22(3), 2000, the contents of which are incorporated by reference herein in their entirety.

Appearance-based methods utilize the texture information of an object for estimating non-rigid deformation. Existing algorithms resort to deformable templates with fiducial points, local parametric image patches, texture within triangulated mesh, elastic bunch graph matching, or a combination of shape and texture. Image warp is obtained by minimizing the sum of squared difference-of-pixel values between the template and an observed image, where affine transformation, graph matching, or an eight-parameter projective model is employed. However, the templates are not updated over time, resulting in problems when the imaging conditions (such as lighting and view angle) differ significantly from those of the stored template. Furthermore, with these approaches, fiducial points or local patches should be manually labeled prior to shape matching. Descriptions of these concepts can be found in M. Black and Y. Yacoob, Tracking and Recognizing Rigid and Non-Rigid Facial Motions Using Local Parametric Models of Image Motion, Proceedings of the Fifth IEEE International Conference on Computer Vision, 1995; T. Cootes, et al., Active Appearance Models, Proceedings of the Fifth European Conference on Computer Vision, volume 2, 1998; T. Cootes, et al., Active Appearance Models, IEEE Transactions on Pattern Analysis and Machine Intelligence, 2001; F. De La Torre, et al., A Probabilistic Framework for Rigid and Non-Rigid Appearance Based Tracking and Recognition, Proceedings of the Fourth International Conference on Automatic Face and Gesture Recognition, 2000; P. L. Hallinan, et al., Two- and Three-Dimensional Patterns of the Face, A. K. Peters, 1998; A. Lanitis, et al., Automatic Interpretation and Coding of Face Images Using Flexible Models, IEEE Transactions on Pattern Analysis and Machine Intelligence, 19(7), 1997, S. Sclaroff and J. Isidoro, Active Blobs, Proceedings of the Sixth IEEE International Conference on Computer Vision, 1998; and L. Wiskott, et al., Face Recognition by Elastic Bunch Graph Matching, IEEE Transactions on Pattern Analysis and Machine Intelligence, 19(7), 1997, the contents of which are incorporated by reference herein in their entirety.

Weiss developed an Expectation-Maximization (EM)-based motion segmentation method by fitting a mixture of smooth flow fields to the spatio-temporal image data. By exploring low rank constraints of the optic flow matrix, Bregler et al. proposed an algorithm for non-rigid object tracking. Although these methods have successfully modeled nonrigid motion using feature points, optical flow estimation is usually sensitive to illumination change, occlusion and noise, thereby limiting the effectiveness of these methods for non-rigid object tracking. Descriptions of these concepts can be found in C. Bregler, et al., Recovering Non-rigid 3D Shape from Image Streams, Proceedings of the IEEE Conference on Computer Vision and Pattern Recognition, 2000; M. Irani, Multi-frame Optical Flow Estimation Using Subspace Constraints, Proceedings of the Seventh IEEE International Conference on Computer Vision, 1999; and Y. Weiss, Smoothness in Layers: Motion Segmentation Using Nonparametric Mixture Estimation, Proceedings of IEEE Conference on Computer Vision and Pattern Recognition, 1997, the contents of which are incorporated by reference herein in their entirety.

The use of thin plate spline (TPS) warp for mapping points between two image frames based on their correspondence was first advocated by Bookstein. TPS warp has been used in image alignment and shape matching. Given a set of n corresponding 2D points, the TPS warp is described by 2(n+3) parameters, which include 6 global affine motion parameters and 2n coefficients for correspondences of control points. These parameters are computed by solving a linear system. One attractive feature of TPS warp is that it consists of affine and non-affine warping transformations, thereby allowing it to capture global rigid and local non-rigid motions. Consequently, TPS has been applied to shape matching, such as in medical imaging, for estimating non-rigid motion. A description of this can be found in F. Bookstein, Principal Warps: Thin-plate Splines and the Decomposition of Deformations, IEEE Transactions on Pattern Analysis and Machine Intelligence, 11(6), 1989, the contents of which are incorporated by reference herein in their entirety.

Chui and Rangarajan presented a method that simultaneously estimates the correspondence of points and non-rigid TPS warps by resorting to the EM algorithm. A description of this can be found in H. Chui and A. Rangarajan, A New Algorithm for Non-Rigid Point Matching, Proceedings of IEEE Conference on Computer Vision and Pattern Recognition, volume 2, 2000, the contents of which are incorporated by reference herein in their entirety.

Conventional methods of recovering the motion of a non-rigid object undergoing shape deformation and pose variation from its appearance thus rely on a sparse set of point correspondences and calculation of TPS parameters. A significant drawback to such methods is the prohibitive expensive of computations for real time applications such as robotics. Thus, there is a need for a more efficient method for modeling the motion of non-rigid objects.

SUMMARY

The present invention includes a system and a method for modeling the motion of a non-rigid object within a sequence of digital images using a thin plate spline (TPS) transform. A first digital image of the sequence is received, and a region of interest, referred to as a template, is chosen. The template can be determined manually or by automatic means such as object detection. A set of fixed control points is positioned on the template. The control points are used to determine the amount of non-rigid deformation, thus they need not lie on specific feature points. Accordingly, control points are also referred to herein as reference points. In one embodiment, the reference points are arranged in a regular pattern such as a rectangular grid.

A target image of the sequence is received for motion estimation. A set of pixels in the target image frame corresponding to the pixels of the template is determined, and this set of pixels is back-warped to match the template based on a TPS parameter vector. A set of reference points is determined within the target image corresponding to the reference points in the template. In one embodiment, the error between the template and the back-warped image is determined and minimized iteratively using a gradient descent technique. TPS parameters corresponding to the final back-warped image can be used to estimate the relative motion between the template and the corresponding region of the target image frame. This process can be repeated until all target images of interest within the sequence of digital images have been processed.

One embodiment applies a stiff-to-flexible approach to mitigate instability when reference points lie in textureless regions, or when the initial TPS parameters are not close to the desired ones. A relatively large value of the regularization parameter is initially applied to make the warp more rigid, or stiff. This forces the reference points within the target images to be determined substantially by the global motion of the image features, rather than by motion of local features. The regularization parameter is then reduced, allowing the warp to become more flexible. This allows the reference points within the target images to be influenced more strongly by local non-rigid deformations, increasing the accuracy of the back-warped image. The value of the regulation parameter can be iterated until a desired accuracy of the back-warped image is obtained.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The Figures and the following description relate to preferred embodiments of the present invention by way of illustration only. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
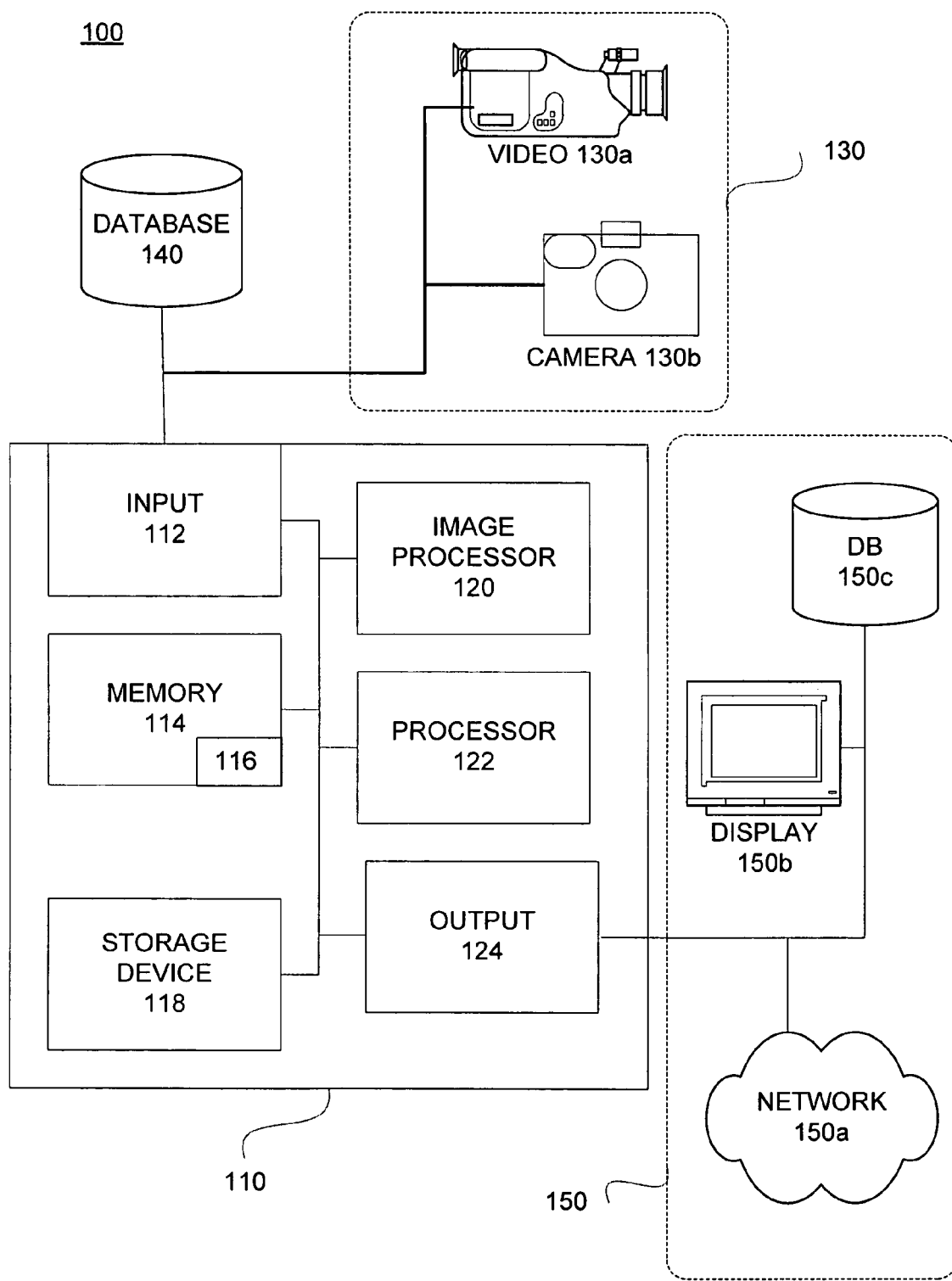
FIG. 1 illustrates one embodiment of a computer system for implementing the invention.

A preferred embodiment of the present invention is now described with reference to the figures where like reference numbers indicate identical or functionally similar elements.

Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

Architectural Overview

FIG. 1 shows a system 100 according to one embodiment of the present invention. Computer system 110 comprises an input module 112, a memory device 114, a storage device 118, a processor 122, and an output module 124. In an alternative embodiment, an image processor 120 can be part of the main processor 122 or a dedicated device to perceive situations as digital images captured in a preferred image format. Similarly, memory device 114 may be a standalone memory device, (e.g., a random access memory (RAM) chip, flash memory, or the like), or a memory on-chip with processor 122 (e.g., cache memory). Storage device 118 may be any bulk storage device such as a hard disk, DVD-R/RW, CD-R/RW or RAM. Likewise, computer system 110 can be a stand-alone system, such as, a server, a personal computer, or the like. Alternatively, computer system 110 can be part of a larger system such as, for example, a robot having a vision system.

According to this embodiment, input module 112 can receive information such as digitized images from a database 140. Input module 112 may also receive digital images directly from an imaging device 130, for example, a digital camera 130*a*, a video system 130*b*, an image scanner, or the like. Alternatively, input module 112 may be an interface to receive information from a network system, for example, another database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like. Image processor 120 can be used to pre-process the digital images received through the input module 112 to convert the digital images to the preferred format on which the processor 122 operates.

Information is stored in the memory device 114 to be processed by processor 122. Processor 122 applies a set of instructions that when executed perform one or more of the methods according to the present invention, for example, estimating the thin plate spline (TPS) warp between images. Memory device 114 may include, for example, a module of instructions 116 for estimating such a TPS warp.

Processor 122 may output information through the output module 124 to an external device 150, e.g., a network element or server 150*a*, a display device 150*b*, a database 150*c* or the like. As with input module 112, output module 124 can be wired or wireless. Output module 124 may be a storage drive interface, (e.g., hard-drive or optical drive driver), a network interface device (e.g., an Ethernet interface card, wireless network card, or the like), or a display driver (e.g., a graphics card, or the like), or any other such device for outputting the information or responses determined.

Determining Non-Rigid Motion

Figure 2:
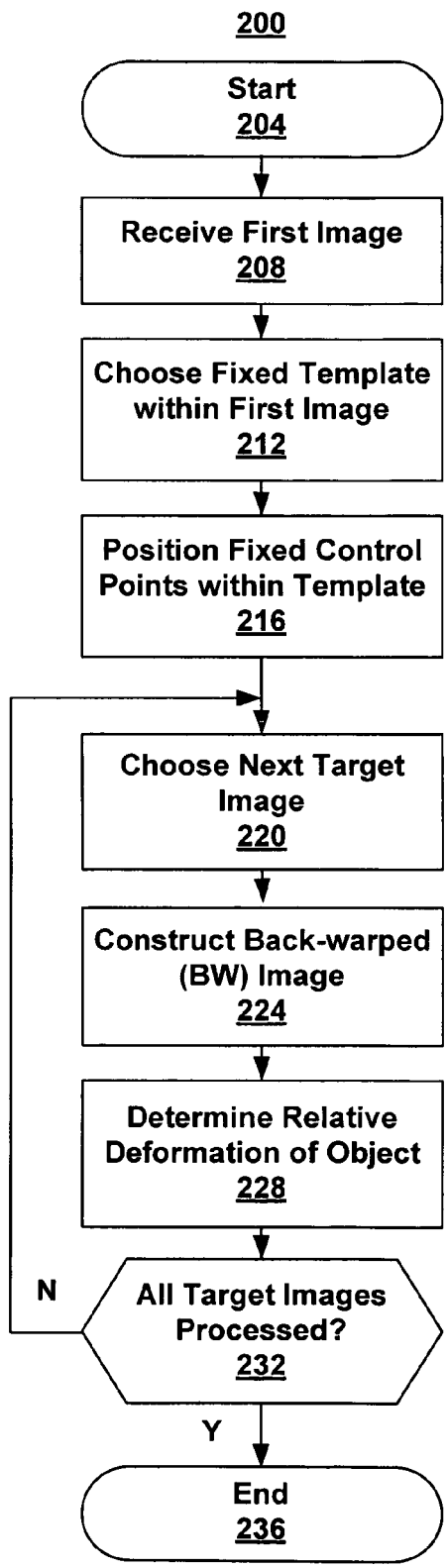
FIG. 2 is a flowchart illustrating a method of determining relative motion of an object within a sequence of video images according to one embodiment of the present invention.

Referring now to FIG. 2, a flowchart 200 for a method of determining the motion of a non-rigid object according to one embodiment of the present invention is shown. In the following discussion, the term "image" is understood to refer to a digital representation of one image of a sequence of images such as a video sequence. A first image is received 208. Within this first image, a reference region referred to as a template is chosen 212, either manually or by an object detector. The template can include an object, region or feature of interest, such as an animal, a human or portion thereof. The template and reference points thereon are assumed to be fixed throughout the subsequent processing. Non-rigid motions of the template within successive images, referred to as target images, can be estimated relative to this template. A goal is to find the TPS warp for each target image that effectively deforms the template so that it aligns well with a corresponding region in the target image.

Figure 3:
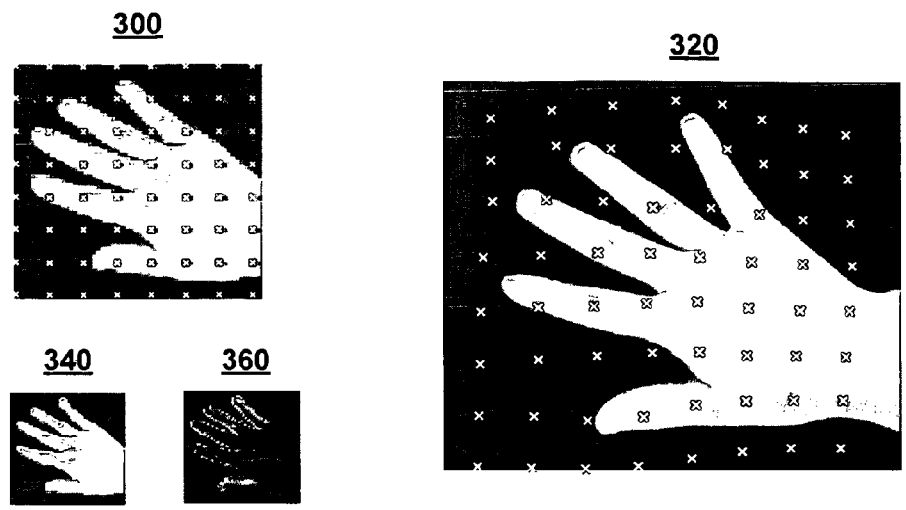
FIG. 3 illustrates various aspects of modeling non-rigid motion using a thin plate spline transformation according to one embodiment of the present invention.

Reference points are positioned 216 within the template. In this embodiment, the reference points are used to determine non-rigid deformation, and thus they need not lie on specific feature points. For convenience, the reference points can be placed in a regular manner, such as on a rectangular grid, as illustrated in image 300 of FIG. 3. Alternately, the reference points can be chosen to correspond to points where interesting or meaningful deformations occur, such as on the periphery of the fingers of the human hand in image 300. A target image is chosen 220, as illustrated for example by target image 320 of FIG. 3. The best TPS warp for the target image is determined by constructing 224 a back-warped image, as illustrated for example by image 340 of FIG. 3. In one embodiment, the back-warped image is determined by an iterative algorithm that minimizes the error between the template and the back-warped image, as illustrated by error image 360 of FIG. 3. Details of step 224 are provided below. Once the back-warped image is constructed, the TPS parameters and the sets of reference points can be used to determine 228 the relative deformation between the template image and the corresponding portion of the target image. The above process repeats 232 until all target images of interest have been processed.

Thin Plate Spline Warp

Given n reference points in a plane $$(\hat{x}_i, \hat{y}_i) \in IR^2$$

and their corresponding function values $\hat{v}_i \in$ IR, i=1, ..., n, the thin plate spline interpolations f(x, y) specifies a mapping f:$IR^2 \to$IR whose bending energy $E_f$ is minimal, where:

$$E_f = \iint_{IR^2} (f_{xx}^2 + 2f_{xy}^2 + f_{yy}^2) dx dy$$

and the interpolated value at a point (x, y) is given by $$f(x, y) = a_1 + a_2 x + a_3 y + \sum_{i=1}^{n} w_i U(\|(\hat{x}_i, \hat{y}_i) - (x, y)\|)$$

where $U(r) = r^2 \log r^2$. The interpolated spline function comprises affine transformation parameterized by a and non-affine warping specified by w.

The spline f(x, y) should have square-integrable second derivatives, which imposes the following constraints $$\sum_{i=1}^{n} w_i = 0, \text{ and } \sum_{i=1}^{n} w_i \hat{x}_i = \sum_{i=1}^{n} w_i \hat{y}_i = 0$$

The TPS parameters a and w can be computed by solving the following linear equation:

$$\begin{bmatrix} A & P \\ P^T & O \end{bmatrix} \begin{bmatrix} w \\ a \end{bmatrix} = \begin{bmatrix} v \\ 0 \end{bmatrix} \quad (1)$$

where $A_{ij} = U(\|(\hat{x}_i, \hat{y}_i) - (\hat{x}_j, \hat{y}_j)\|)$, the i-th row of P is $(1, \hat{x}_i, \hat{y}_i)$, O and 0 are 3×3 and 3×1 zero matrices, respectively, and w, a and v are vectors formed from $w_i$, $a_1$, $a_2$, $a_3$ and $\hat{v}_i$, respectively. The leftmost (n+3)×(n+3) matrix in equation (1) is denoted as K. When noise exists in the target value $\hat{v}_i$, a regularization parameter λ is introduced to control the amount of TPS smoothing. Accordingly, the submatrix A in Equation 1 is replaced by A+λI, where I is an n×n identity matrix. A description of this can be found in Bookstein, which is referenced above.

In the analysis below, 2D points are warped using a TPS defined by pairs of reference points, with the goal of mapping points (x, y) to (x', y') given n control point correspondences $$(\hat{x}_i, \hat{y}_i) : (\hat{x}'_i, \hat{y}'_i)$$

between the template and target, respectively. Toward that end, TPS functions are separately applied for the x and y coordinates. From Equation 1 the TPS warp which maps $$(\hat{x}'_i, \hat{y}_i)$$

onto $$(\hat{x}'_i, \hat{y}'_i)$$

can be recovered by:

$$\begin{bmatrix} w_x & w_y \\ a_x & a_y \end{bmatrix} = K^{-1} \begin{bmatrix} \hat{x}' & \hat{y}' \\ 0 & 0 \end{bmatrix} \quad (2)$$

where $\hat{x}'$ and $\hat{y}'$ are the vectors formed with $\hat{x}_i'$ and $\hat{y}_i'$, respectively.

The transformed coordinates $(x'_j, y'_j)$ of points $(x_j, y_j)$ are given by $$[x' \quad y'] = [B \quad Q] \begin{bmatrix} w_x & w_y \\ a_x & a_y \end{bmatrix} \quad (3)$$

where $$B_{ji} = U(\|(x_j, y_j) - (\hat{x}_i, \hat{y}_i)\|),$$

the $j^{th}$ row of Q is $(1, x_j, y_j)$, and the $j^{th}$ row of the resulting vectors x' and y' are the interpolated x and y coordinates $x'_j$ and $y'_j$, respectively. The matrix [B Q] is denoted below as M.

Efficient TPS Warp Estimation

To find the best TPS warp for each target image, the region within the target image corresponding to the template is found. This can be accomplished, for example, by warping each pixel in the template image and finding a corresponding pixel value within the target image by linear interpolation of neighboring pixels in the target image.

Combining equations 2 and 3 yields the following equation that relates the warped positions of pixels with the positions of reference points:

$$[x' \quad y'] = MK^{-1} \begin{bmatrix} \hat{x}' & \hat{y}' \\ 0 & 0 \end{bmatrix} \quad (4)$$

The transformed coordinate $$(x'_i, y'_i)$$

of the target image in the above equation can be expressed in terms of a linear combination of the coordinates of the reference points in the template image $$(\hat{x}'_i, \hat{y}'_i).$$

The matrices M and K remain constant if the reference points $$(\hat{x}'_i, \hat{y}'_i)$$

and the set of points $(x_j, y_j)$ in the template remain constant. Note that the TPS kernel matrices M and K remain constant during the estimation process due to the constancy assumption of the template and the reference points. Thus in this embodiment the TPS warp is determined solely by the coordinates of reference points in the target image $\hat{x}'$ and $\hat{y}'$. Inverting a large matrix such as K is computationally intensive. Thus, in one embodiment, $MK^{-1}$ is pre-computed during an initialization stage, and the subsequent TPS warps can be computed very efficiently.

Representing the template image by $I_0$ and the target image by I, non-rigid motion estimation is modeled as the minimization of the following error function:

$$E(\mu) = \sum_{p=(x,y)} \|I(w(p;\mu)) - I_0(p)\|^2 \quad (5)$$

where $p=(x, y)$ is a point in the template image and $w(p;\mu)$ is a TPS warp with parameter $\mu$. The parameter $\mu$ can be considered to comprise the components a and w, as discussed above. From Equation 4, the TPS parameter vector $\mu$ is $$(\hat{x}'^T, \hat{y}'^T)^T$$

and the top $(n+3) \times n$ submatrix of $K^{-1}$ is denoted as $K_{(n+3)\times n}^{-1}$. The warped coordinate can then be expressed as:

$$\omega(p;\mu) = [M_p K_{(n+3)\times n}^{-1} | M_p K_{(n+3)\times n}^{-1}]\mu$$

where Mp is the row corresponding to p in the pre-computed matrix M.

Following from direct methods for estimating affine parameters using object appearance, gradient descent techniques can be applied to find $\mu$ that minimizes Equation 5. Descriptions of this can be found in G. Hager and P. Belhumeur, Real-time Tracking of Image Regions with Changes in Geometry and Illumination, Proceedings of the IEEE Conference on Computer Vision and Pattern Recognition, 1996, and in J. Shi and C. Toamsi, Good Features to Track, Proceedings of the IEEE Conference on Computer Vision and Pattern Recognition, 1994, which are incorporated by reference herein in their entirety. Using a Taylor series expansion, the warped image $I(w(p;\mu))$ can be expressed as:

$$I(w(p; \mu_0 + \delta\mu)) = I(w(p; \mu_0)) + \delta\mu^\top \nabla I(w(p; \mu_0)) + h.o.t \quad (6)$$

where "$h.o.t$" represents higher-order terms, and $$\nabla I(\cdot) = \left(\frac{\partial}{\partial \mu_1} I(\cdot) | \ldots | \frac{\partial}{\partial \mu_k} I(\cdot)\right)^\top$$

Each term $(\partial/\partial \mu_r) I(\cdot)$ can be computed using the gradient image of I. Substituting Equation 6 into the Equation 5 and ignoring the higher-order-terms, the error function $E(\mu)$ can be rewritten in terms of $\delta\mu$, $$E(\delta\mu) = \sum_p \|I(w(p; \mu_0)) - I_0(p) + \nabla I(w(p; \mu_0))^\top \delta\mu\|^2 \quad (7)$$

and $\delta\mu$ that decreases the error function can be computed as $$\delta\mu = (W^\top W)^{-1} W^\top I_t \quad (8)$$

where $$W_{ji} = \frac{\partial}{\partial \mu_i} I(w(p_j; \mu_0))$$

and $I_t$ is the vector with $I(w(p_j; \mu_0)) - I_0(p_j)$ as its $j^{th}$ row value.

Stiff-to-Flexible Approach

TPS warp offers great flexibility in shape matching. However, care should be taken to prevent instability when some reference points lie in textureless regions, or when the initial TPS parameter $\mu$ is not close to the desired one. When a new target image is chosen 220, the initial TPS parameters can be set to those obtained for the previously-chosen target image. At such point, the TPS parameters are expected to be close to the true ones, since the inter-image motion in a video is usually small. However, straightforward application of the above algorithms may not find the desired estimate. For example, control point regions without much texture may not contain sufficient visual information for desired convergence. Also, an aperture problem may arise, since when an object moves, with certain textures some reference points may not move along with others.

According to one embodiment, a stiff-to-flexible approach can mitigate such situations by varying the value of the regularization parameter $\lambda$. This embodiment initially uses a larger value of $\lambda$, say $\lambda_0$, and updates the reference points to substantially follow global, rather than local, motion by forcing the warp to be more rigid, or stiff. The algorithm then becomes more flexible by repeating with one or more smaller values of $\lambda$, say $\lambda_k$, to increasingly capture local non-rigid deformations. This process can be repeated until a desired estimate is obtained.

Figure 4A:
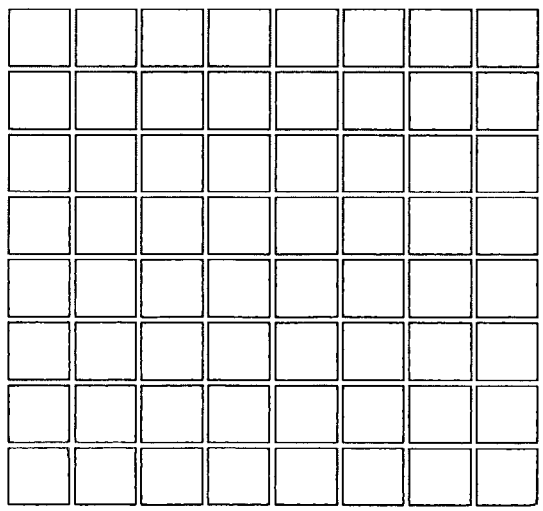
FIG. 4 illustrates the effect of varying a regularization parameter according to one embodiment of the present invention.

The effect of varying $\lambda$ is shown in FIG. 4 by the "support patterns" at each control point. More particularly, FIG. 4 shows how the image gradient and the temporal derivative at each pixel in the template contribute to the update of the 8×8 control point grid. Each patch represents the degree to which each pixel in the template image contributes to the update of the nearest control point. As shown in FIG. 4a, larger values of $\lambda$ make the estimated warp more stiff, or rigid, such that the region of significance in the vicinity of each control point is larger. As $\lambda$ increases, the support spreads out such that a greater number of pixels affect the update of each control point.

Figure 4B:
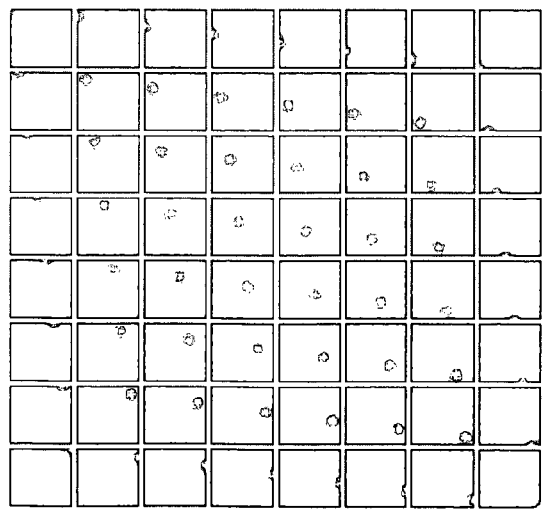

Smaller values of $\lambda$ make the estimated warp more flexible, that is, the region of significance in the vicinity of each control point becomes smaller. Thus, each control point can move more freely, being unaffected by appearance changes relatively far away. For example, FIG. 4b shows contribution from the TPS kernel with relatively small $\lambda$.

Figure 5:
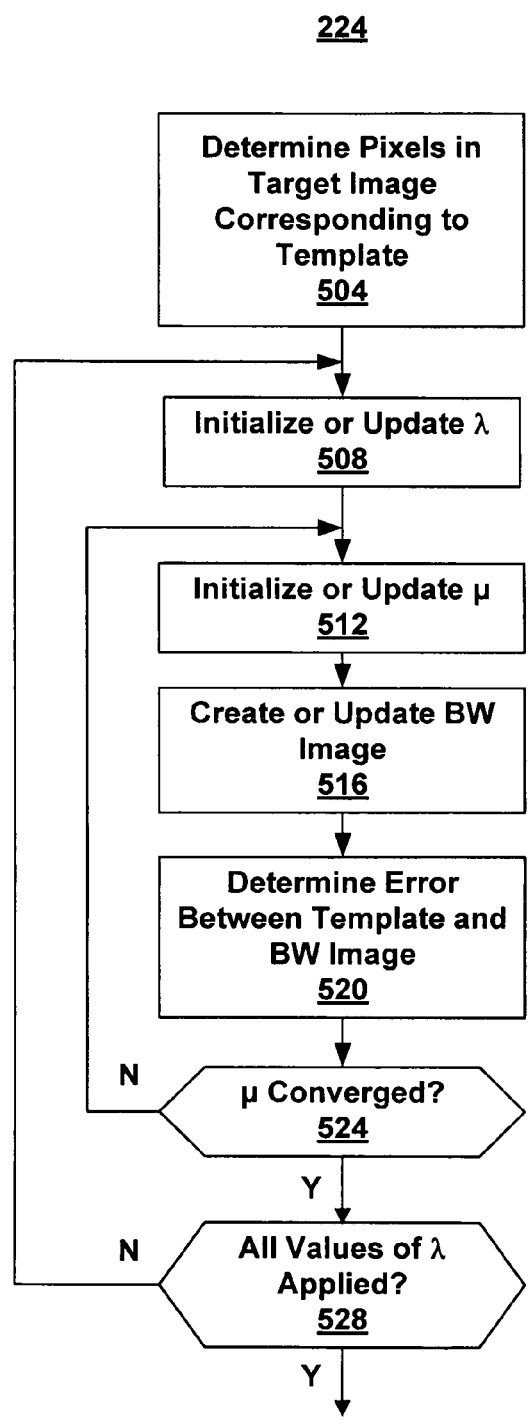
FIG. 5 is a flowchart illustrating a method for estimating a thin plate spline warp between images according to one embodiment of the present invention.

Referring now to the flow diagram of FIG. 5, a method for constructing a back-warped image 224 according to one embodiment of the present invention is summarized. The pixels in the target image corresponding to the pixels in the template are determined 504. The regularization parameter $\lambda$ is initialized 508 to a first value of zero or greater. The TPS warp parameter $\mu$ is initialized 512 to an estimate $\mu_0$, and $\delta\mu$ is initialized to zero. As discussed above, $\mu$ comprises the components a and w. Thus, $\mu_0$ can be determined based on the value of a that corresponds to the initial tracking region, and on a value of w of zero (corresponding to no local deformation). A first version of the back-warped image is created 516. The error between the template and the back-warped image is next determined 520 based on equation (7). The value of $\mu$ is tested 524 for convergence. If $\mu$ has not converged, it is updated 512 by an amount $\delta\mu$ according to equation (8), and steps 516 and 520 are repeated. If $\mu$ has converged and a next value of $\lambda$ is to be applied, steps 508 through 524 are repeated. The back-warped image is finalized when all chosen values of $\lambda$ have been applied and $\mu$ has converged for each choice of $\lambda$. Convergence of $\mu$ may be evaluated by any of a number of methods. For example, it can be determined that the differential error between the template and the back-warped image from one iteration to another has fallen below a threshold. Alternately, it can be determined that $\delta\mu$ has fallen below a threshold. Persons skilled in the art will appreciate that other methods of determining the convergence of $\mu$ are possible.

Experimental Results

Figure 6:
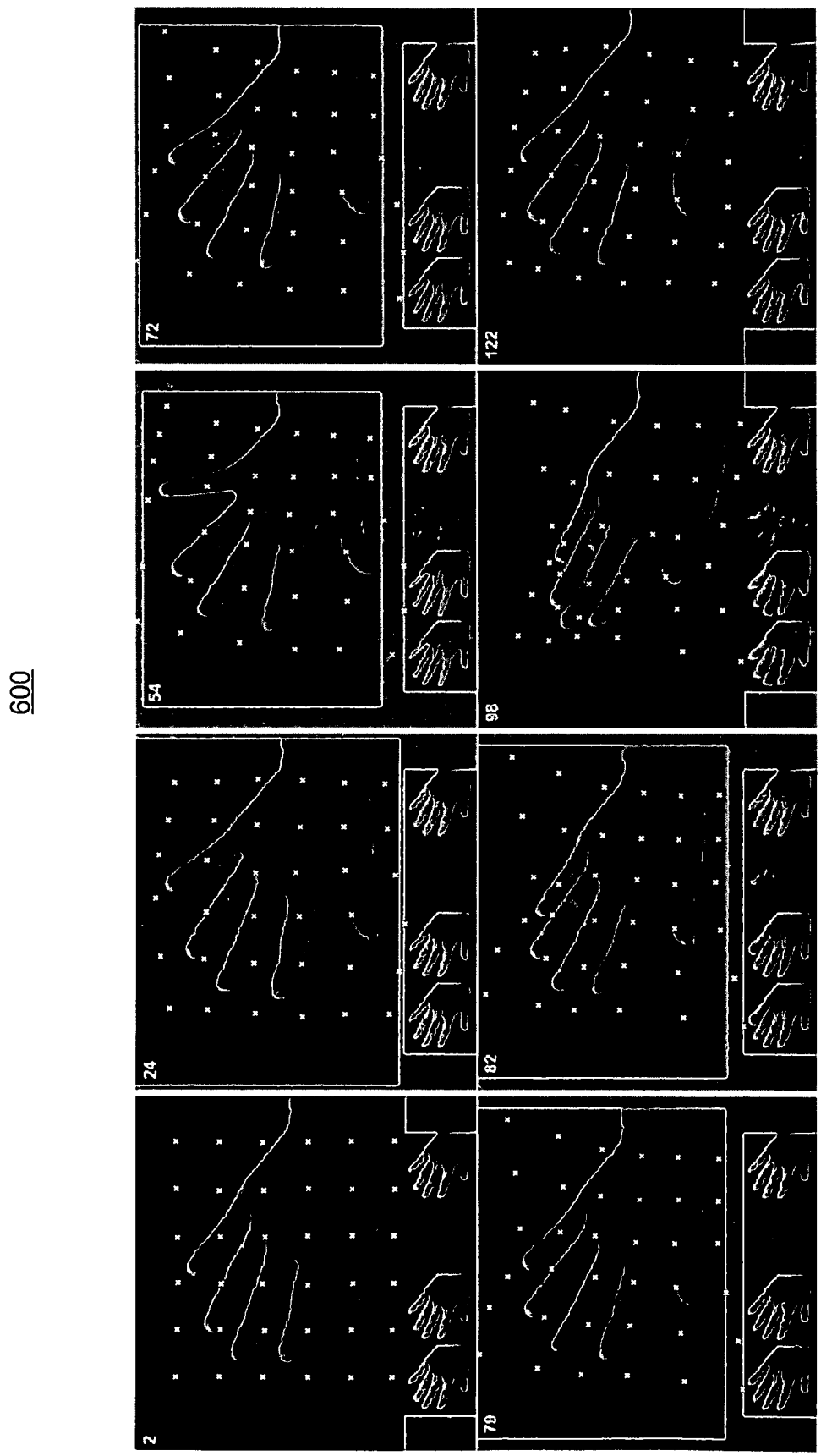
FIG. 6 illustrates partial results of one experimental application of one embodiment of the present invention.

The method discussed above was applied to model non-rigid motion in motion videos with large shape deformation and pose variation. One evaluation operated on a video sequence of articulated hand motions. As shown in the video sequence of FIG. 6, a hand is moving with fingers stretching outward and inward against a dark background. The large images in FIG. 6 show images from the video sequence, starting with the template image in the upper left and proceeding to the various target images. FIG. 6 shows the TPS reference points that are initialized in the template and estimated in successive target images in order to account for non-rigid hand motion. The template has been initialized with a neutral hand image, and an 8×8 grid of 64 reference points is employed to model non-rigid hand motion. The sizes of some of the target images of FIG. 6 have been scaled so that all control points are visible. However, the actual target images of this sequence are of the same size. The method of the invention does not require any specific feature points to model non-rigid motion, but rather minimizes the mismatch error between the back-warped image and the template. Thus, there is no restriction on how the reference points are laid out. A uniform grid was chosen here for simplicity and to allow each reference point to similarly deform.

Below each large image of FIG. 6 appear, from left to right, the back-warped image using a first regulation parameter, the back-warped image using a final regulation parameter, the error between the template and the back-warped image using the final regulation parameter, and the template. Contrary to intuition, the simple background can cause stability problems, as many reference points are located in the background. Since there is little information near the reference points located in the background, such points can be easily affected by image noise. Nevertheless, by applying the stiff-to-flexible approach, arrangement of the reference points is correctly maintained throughout the sequence.

Note that there is a scarcity of texture information in the images. Thus, it is difficult to extract features or establish feature point correspondences between images. Consequently, algorithms that depend on features will not model such hand motion well. However, as shown in FIG. 6, the method of the invention is able to stably track the articulated hand motion.

Figure 7:
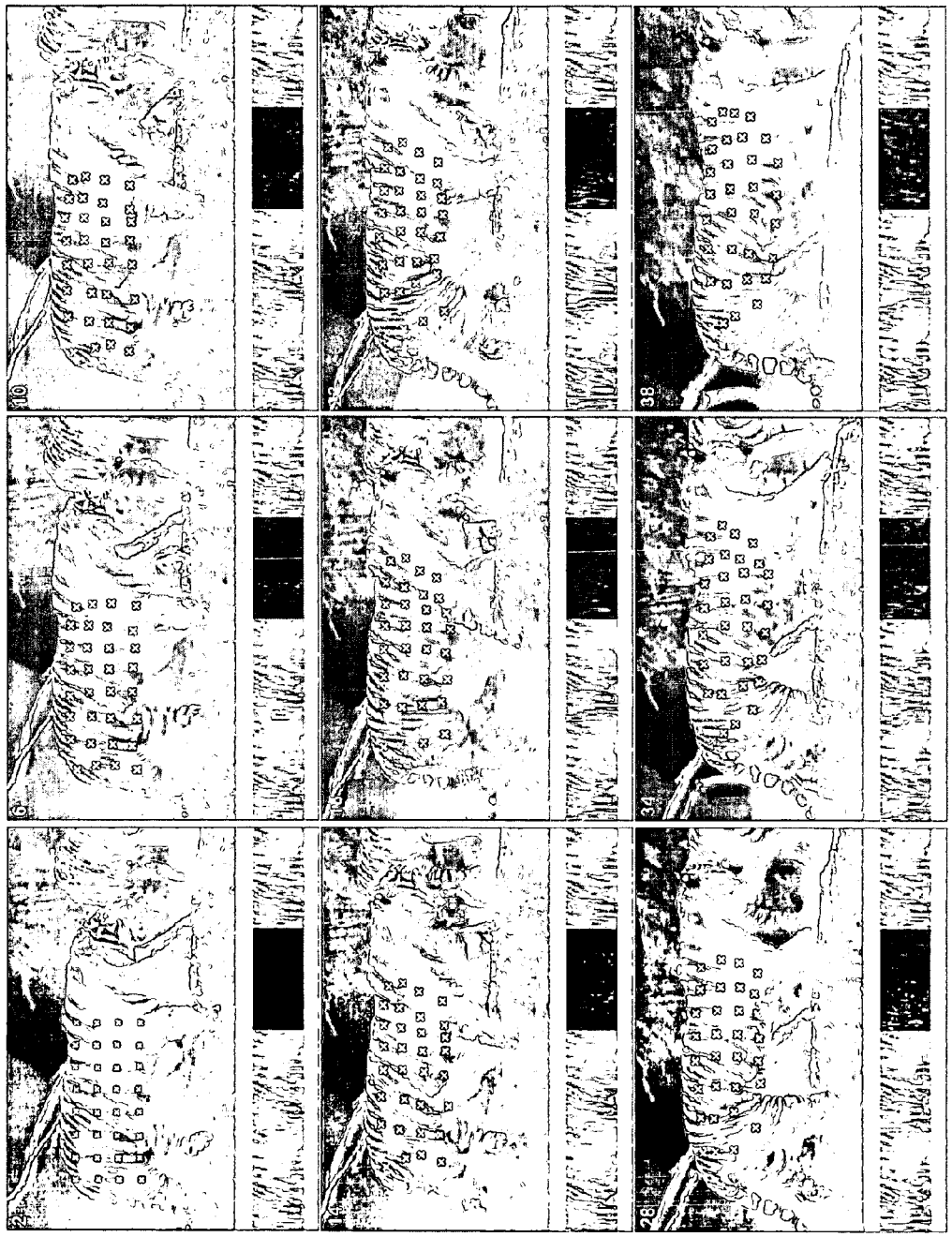
FIG. 7 illustrates partial results of another experimental application of one embodiment of the present invention.

Another evaluation applied the invention to a video of a strolling tiger, as shown in FIG. 7. As in FIG. 6, each large image in FIG. 7 is an image from the video sequence, starting with the image containing the template. Below each large image are again, from left to right, the back-warped image using a first regulation parameter, the back-warped image using a final regulation parameter, the error between the template and the back-warped image using the final regulation parameter, and the template. The results show that the method of the invention is able to account for the non-rigid motion of the torso region of the tiger. As with the hand motion in FIG. 6, the torso region in the sequence of FIG. 7 deforms non-rigidly as the tiger strolls. Such a sequence can easily defeat methods that only model rigid motion. As shown in FIG. 7, the method of the invention models the motion details of the torso region accurately, as the back-warped image regions match the templates well.

Figure 8:
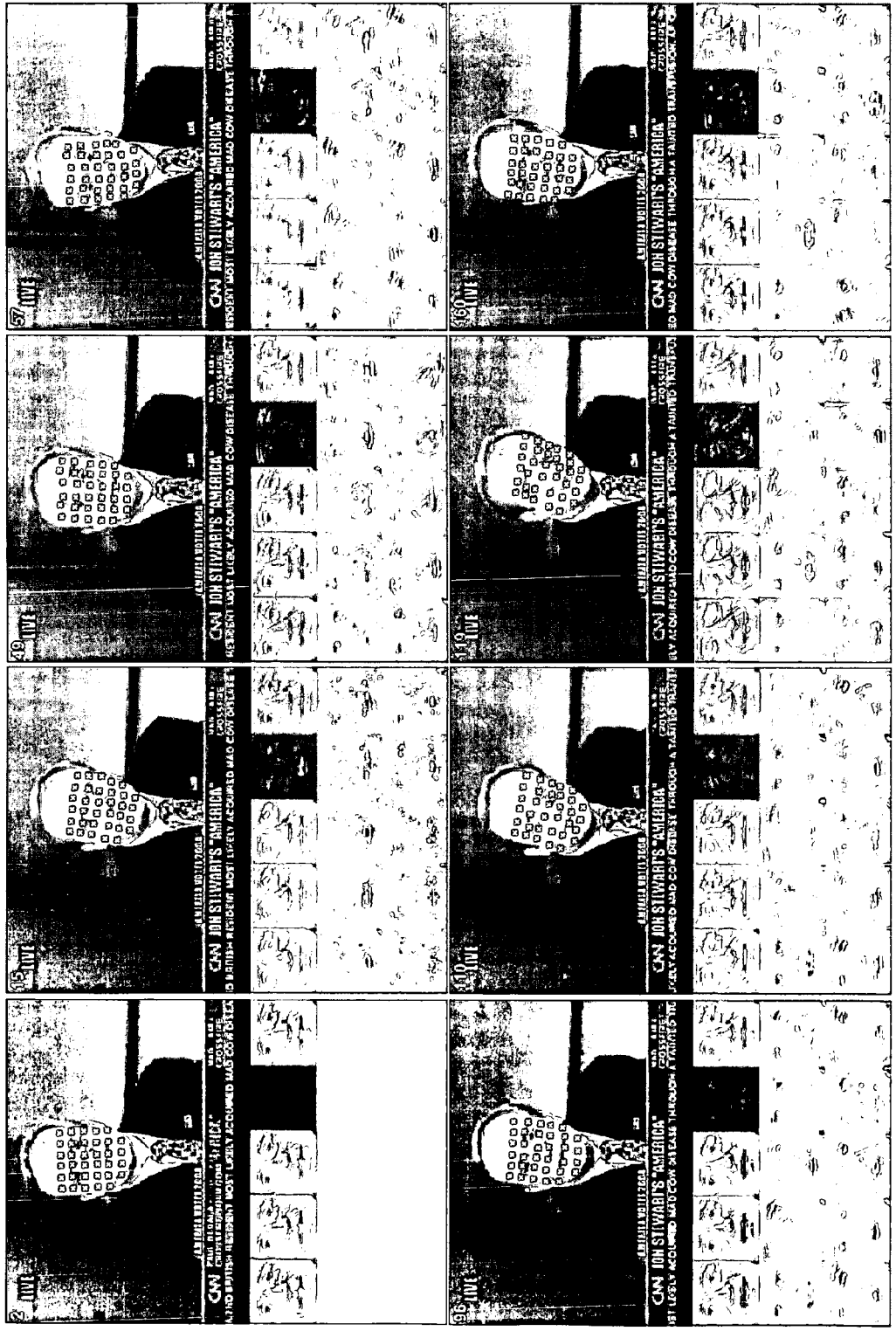
FIG. 8 illustrates partial results of another experimental application of one embodiment of the present invention.

The video sequence of FIG. 8 includes a person with changing facial expression and pose. The motion details and shape deformation cannot be modeled well with affine transformation alone. Nonetheless, the invention is able to faithfully account for motion details as shown. In FIG. 8, each large image is an image from the video sequence, starting with the template image. Note that fewer reference points were used in the bottom row, since additional points positioned at the ends of this row could fall outside the face region, and could result in tracking error. As discussed above, control points need not be arranged on a rectangular or regular grid, and the target image need not be rectangular. Underneath each large image in FIG. 8 appear, from left to right, three warped images corresponding to three values of regularization (from stiff to flexible), followed by error between the template and the final warped image. These results show that the invention is able to model motion caused by facial expression and pose variation. The two rows below each large image are the appearance basis for the TPS warping, learned using an online appearance learning algorithm, thereby enabling analysis of facial motion. A description of this can be found in J. Lim, et al., Incremental Learning for Visual Tracking, L. Saul, et al., editors, Advances in Neural Information Processing Systems, 17 MIT Press, 2005, the contents of which are incorporated by reference herein in their entirety.

The invention claimed:

1. A computer based method for estimating a thin plate spline (TPS) warp between two digital images of a sequence of digital images representing one or more physical objects, the digital images comprising pixels, the method comprising:
receiving first and second digital images of the sequence of digital images;
determining a fixed template region within said first image;
positioning a fixed set of reference points within said fixed template region;
determining a first set of pixels within said second image, said first set of pixels corresponding to said fixed template region and including a set of projections of said fixed reference points;
determining a TPS parameter vector from said set of projections;
determining a back-warped image by warping said first set of pixels based on said TPS parameter vector.

2. The method of claim 1, further comprising the steps of:
determining an error function based on a difference between said fixed template region and said back-warped image; and
updating said TPS parameter vector based on said error function and using a gradient descent technique.

3. The method of claim 2, further comprising the step of:
re-determining said back-warped image based on said updated TPS parameter vector.

4. The method of claim 1, wherein said reference points are arranged on a rectangular grid.

5. The method of claim 1, wherein said fixed template region is determined automatically.

6. The method of claim 1, further comprising the step of:
determining a first value of a regularization parameter that determines the degree to which pixels in said template image contribute to an update of said set of reference points;
determining a second value of said regularization parameter following said determining a back-warped image; and
refining said back-warped image based on said updated value of said regularization parameter.

7. The method of claim 1, wherein said fixed template region includes a non-rigid object.

8. The method of claim 7, wherein a relative motion of said non-rigid object is determined based on said TPS parameter vector.

9. The method of claim 1, wherein a set of reference points within said second digital image is determined based on said fixed set of reference points within said first digital image.

10. The method of claim 9, wherein a relative motion is determined based on said set of fixed reference points and said set of reference points within said second digital image.

11. An apparatus for automatically estimating a thin plate spline (TPS) warp between two digital images of a sequence of digital images representing one or more physical objects, the digital images comprising pixels, the apparatus comprising:
an input module configured to receive first and second digital images of the sequence of digital images; and
a processor module configured to:
determine a fixed template region within said first digital image,
position a fixed set of reference points within said fixed template region,
determine a first set of pixels within said second image, said first set of pixels corresponding to said fixed template region and including a set of projections of said fixed reference points,
determine a TPS parameter vector from said set of projections, and
determine a back-warped image by warping said first set of pixels based on said TPS parameter vector.

12. An apparatus for automatically estimating a thin plate spline (TPS) warp between two digital images of a sequence of digital images representing one or more physical objects, the digital images comprising pixels, the apparatus comprising:
means for receiving first and second digital images of the sequence of digital images;
means for determining a fixed template region within said first image;
means for positioning a fixed set of reference points within said fixed template region;
means for determining a first set of pixels within said second image, said first set of pixels corresponding to said fixed template region and including a set of projections of said fixed reference points;
means for determining a TPS parameter vector from said set of projections; and
means for determining a back-warped image by warping said first set of pixels based on said TPS parameter vector.

13. A computer program product, comprising a computer-readable medium having computer program instructions embodied thereon to cause a computer processor to implement a method for estimating a thin plate spline (TPS) warp between two digital images of a sequence of digital images representing one or more physical objects, the digital images comprising pixels, the method comprising:
receiving first and second digital images of the sequence of digital images;
determining a fixed template region within said first image;
positioning a fixed set of reference points within said fixed template region;
determining a first set of pixels within said second image, said first set of pixels corresponding to said fixed template region and including a set of projections of said fixed reference points;
determining a TPS parameter vector from said set of projections;
determining a back-warped image by warping said first set of pixels based on said TPS parameter vector.

* * * * *